United States Patent
Macaulay

Patent Number: 5,434,595
Date of Patent: Jul. 18, 1995

[54] SYSTEM AND METHOD FOR AUTOMATICALLY CORRECTING X-Y IMAGE DISTORTION IN A DISPLAY

[75] Inventor: Malcolm Macaulay, Fullerton, Calif.

[73] Assignee: Hughes Aircraft Company, Los Angeles, Calif.

[21] Appl. No.: 67,451

[22] Filed: May 24, 1993

[51] Int. Cl.$^6$ .............................................. G09G 1/00
[52] U.S. Cl. ................................... 345/207; 348/117; 348/745; 382/293; 382/309
[58] Field of Search ................... 355/210, 213; 382/42, 382/43, 44; 345/9, 12, 13, 14, 207; 250/213, 396 R; 348/117, 190, 191, 745; 315/370

[56] References Cited

U.S. PATENT DOCUMENTS

| | | | |
|---|---|---|---|
| 4,099,092 | 4/1978 | Bristow | 315/10 |
| 4,257,024 | 3/1981 | Shimoma et al. | 335/213 |
| 4,386,349 | 5/1983 | Granberg et al. | 345/13 |
| 4,437,008 | 3/1984 | Matsuda et al. | 345/13 |
| 4,499,457 | 2/1985 | Hintze | 345/13 |
| 4,558,462 | 12/1985 | Horiba et al. | 382/42 |
| 4,683,467 | 7/1987 | Macalay et al. | 345/9 |
| 4,891,507 | 1/1990 | Lindmayer et al. | 250/213 VT |
| 5,020,116 | 5/1991 | Macaulay | 382/44 |
| 5,266,938 | 11/1993 | Mogi et al. | 345/13 |

FOREIGN PATENT DOCUMENTS 0474420 11/1992 European Pat. Off. .
3311786 4/1984 Germany .

Primary Examiner—Ulysses Weldon
Assistant Examiner—Amare Mengistu
Attorney, Agent, or Firm—W. K. Denson-Low

[57] ABSTRACT

A system for detecting and automatically correcting X-Y errors in displayed image data. In a specific implementation, the invention (6, 10) includes a display driver (12, 14, 16, 4) for commanding the display (2) to display a picture element of an image at a predetermined position on a display screen thereof. The actual position of the displayed picture element is detected (6) and used to calculate a set of correction factors which are used in real time to correct the positioning of picture elements of actual image data (20, 24, 5).

16 Claims, 2 Drawing Sheets

O = APERTURE

SYSTEM AND METHOD FOR AUTOMATICALLY CORRECTING X-Y IMAGE DISTORTION IN A DISPLAY

BACKGROUND OF THE INVENTION

1. Field of the Invention

The present invention relates to display systems. More specifically, the present invention relates to systems for improving the image quality of large screen display systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Image registration and distortion are critical issues in large screen display design. U.S. Pat. Nos. 4,683,467, issued Jul. 28, 1987 to Macaulay et al., and 5,020,116, issued May 28, 1991 to Macaulay, (the teachings of which are incorporated herein by reference) describe image registration systems which incorporate a photodetector arrangement to align color images in large screen displays. Unfortunately, these systems were not designed to resolve X-Y image distortion, a mispositioning of pixels in the x and y plane of the display.

Barrel distortion and pin cushion distortion are two well known examples of the effects of X-Y image distortion. X-Y image distortion is due to many factors including nonlinearities in deflection circuits and mechanisms and leakages in deflection yokes.

The conventional technique for correcting for distortion in large screen displays is to overlay a grid on the screen and project a test pattern on the screen. A human operator then uses a cursor to move pixels that are out of place to a proper position as determined by the grid. The degree of movement required to position the pixel is stored and used as a correction factor to position pixels of actual image data.

Unfortunately, this process is tedious and error prone. The correction factor may vary with each operator and, in the case of direct view cathode ray tube displays, movement of the operator's head may change the viewing position and introduce parallax error. Also, no reference element is commonly provided so that linearity can not be established accurately.

In the case of projection displays, a carefully ruled calibration reference screen is required. Some mechanism is required to install such a screen on a temporary basis during the convergence and linearity adjustment process. The physical layout of the viewing theater may make even temporary installation difficult or impractical. In addition, there is often no safe vantage point for a human operator.

Thus, there is a need in the art for an automatic system and technique for correcting image distortion in large screen display systems which minimizes the need for operator involvement.

SUMMARY OF THE INVENTION

The need in the art is addressed by the present invention which provides a system for detecting and automatically correcting X-Y errors in displayed image data. In a specific implementation, the invention includes a display driver for commanding the display to display a picture element of an image at a predetermined position on a display screen thereof. The actual position of the displayed picture element is used to calculate a set of correction factors which are used in real time to correct the positioning of picture elements of actual image data.

DESCRIPTION OF THE INVENTION

Illustrative embodiments and exemplary applications will now be described with reference to the accompanying drawings to disclose the advantageous teachings of the present invention.

Figure 1:
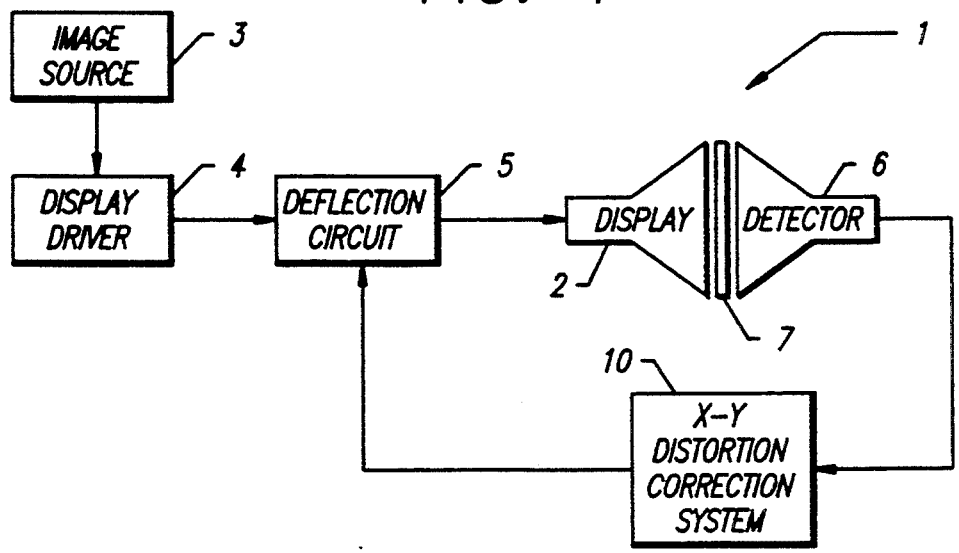
FIG. 1 is a simplified block diagram of an illustrative display system incorporating the X-Y distortion correction system of the present invention.

FIG. 1 is a simplified block diagram of an illustrative display system 1 incorporating the X-Y distortion correction system 10 of the present invention. The display system 1 includes a conventional display device 2 which may be a projector or a direct view flat screen or a cathode ray tube (CRT). In the illustrative system, the display is implemented with a direct view cathode ray tube. As is well known in the art, the cathode ray tube includes one or more deflection yokes which magnetically control the scan of a beam which selectively illuminates picture elements (pixels) on the screen of the display. Image data from a source 3 controls a display driver 4 which provides signal levels necessary to drive the electron beam of the display. The yokes (not shown) of the display 2 are driven by a deflection circuit 5.

As discussed above, X-Y image distortion is due to many factors including nonlinearities in the deflection circuits and mechanisms and leakages in deflection yokes. The system 10 of the present invention automatically corrects for X-Y distortion without requiring use of the tedious manual correction technique of the prior art. The system 10 operates with a photodetector 6. In the illustrative system 1 of FIG. 1, the photodetector 6 is shown large relative to the display 2. In practice, the display 2 may be a large screen display and the photodetector 6 may be a single photodetector element. Nonetheless, for the purpose of illustration, the photodetector 6 of FIG. 1 is implemented as an array of detector elements. The photodetector 6 is interfaced with the display 2 with a fiber optic faceplate 7. The faceplate 7 is an array of tightly packed optical fibers which assure that a single photodetector is illuminated by a single pixel or small group of pixels from the display 2.

In accordance with the present teachings, during calibration of the display 2, the detector array 6 provides data to the distortion correction system 10 indicating the position of an errant pixel from a test pattern supplied by the distortion correction system 10.

As discussed more fully below, the distortion correction system 10 stores error signals indicative of the magnitude and direction of correction required to restore each errant pixel in the test pattern to a predetermined (e.g. proper) position. This assures that image data from the source 3 will be displayed accurately by the display 2.

Figure 2:
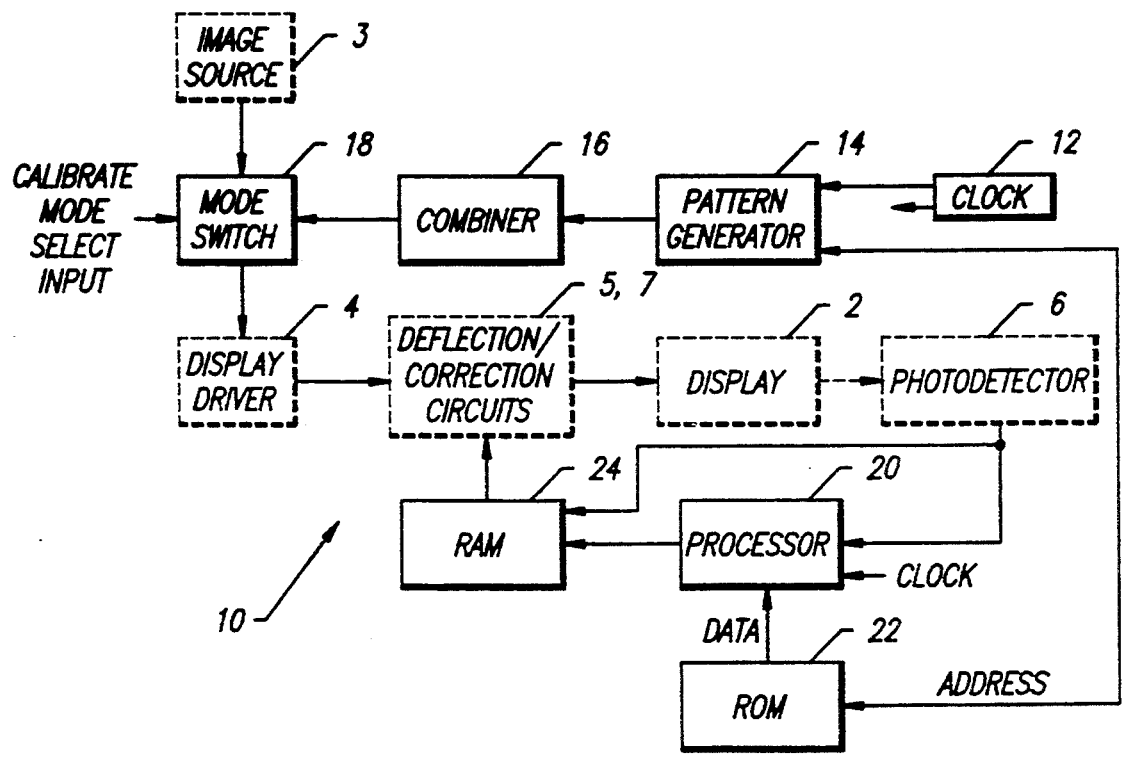
FIG. 2 is a block diagram of an illustrative display system of FIG. 1 with the X-Y distortion correction system of the present invention shown in more detail.

FIG. 2 is a block diagram of an illustrative display system 1 of FIG. 1 with the X-Y distortion correction system 10 of the present invention shown in more detail. In accordance with the present teachings, the system 10 includes a clock 12 which feeds a pattern generator 14 and numerous other digital circuits in the system 10 as will be appreciated by those skilled in the art.

Figure 3:
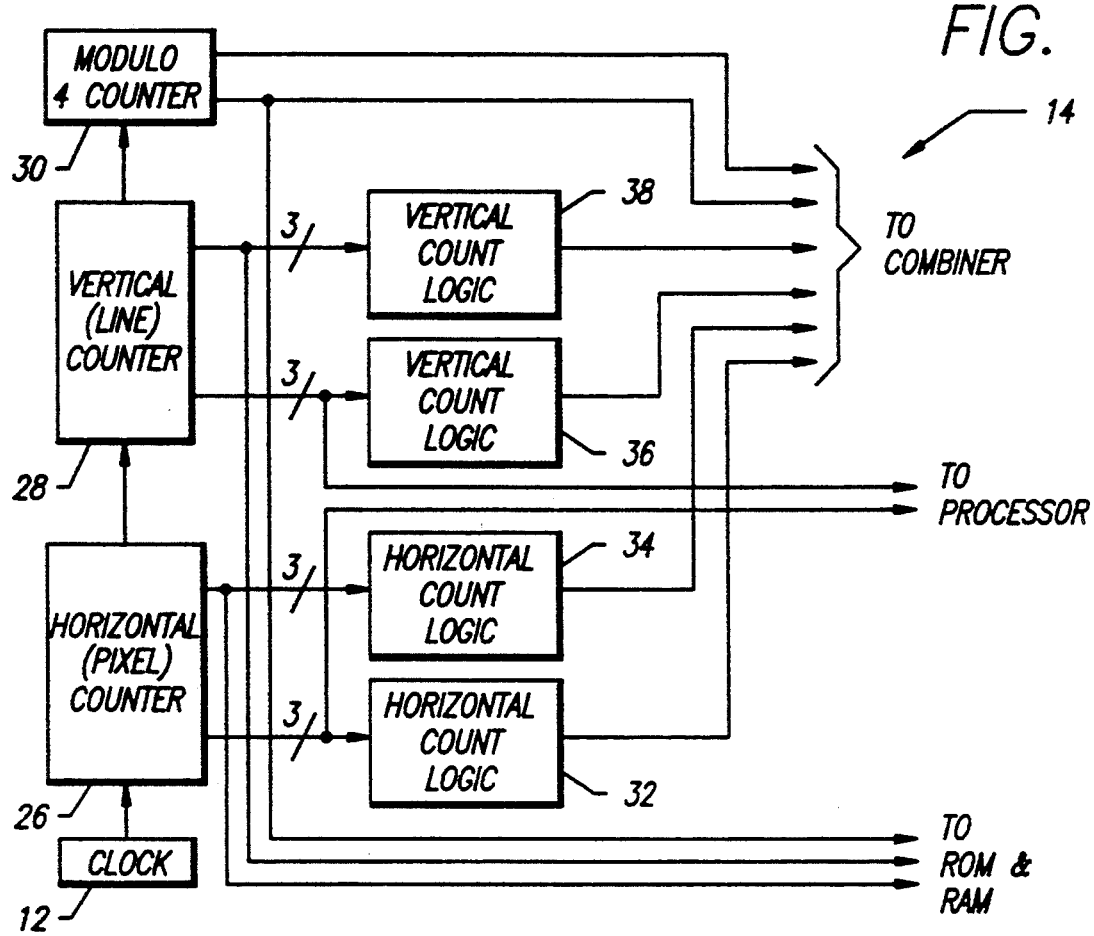
FIG. 3 is a block diagram of an illustrative implementation of the pattern generator of the X-Y distortion correction system of the present invention.

FIG. 3 is a block diagram of an illustrative implementation of the pattern generator 14. Clock pulses are counted by a horizontal (pixel) counter 26 which may be implemented with a shift register. First and second horizontal count logic circuits 32 and 34 provide signals to the combiner 16 when a predetermined pixel count is reached in accordance with the desired test pattern. When the maximum pixel count is reached, a second counter is incremented. The second counter is a vertical (line) counter 28. First and second vertical count logic circuits 36 and 38 provide signals to the combiner 16 when a predetermined line count is reached in accordance with the desired test pattern. The horizontal and vertical count logic circuits may be implemented conventionally by one of ordinary skill in the art of digital circuit design. In the illustrative embodiment, for each color, the pattern generator 14 activates each pixel in a sequential manner thereby generating a flat field. Then the beam is reset to the top of the screen and restarted for the next color and so on.

Returning to FIG. 2, the output of the pattern generator 14 is provided to a combiner 16 which generates red, green, blue and sync signals for the display 2. Signals from the combiner 16 are input to a switch 18 which allows for the mode to be changed from a calibrate mode, by which a test pattern is displayed, to normal mode of operation, by which normal image data is displayed.

The selected signals are input to a convention display driver circuit 4. The output of the display driver 4 is provided to the display via a deflection correction circuit 5. The photodetector array 6 provides information regarding the addresses of errant pixels from the displayed test pattern to a processor 20. For each pixel, the processor 20 calculates a set of x and y correction factors based on the actual displayed position of each pixel and the predetermined proper position of the pixel as provided by a read-only memory (ROM) 22. The x,y correction factors are stored at corresponding addresses in a random access memory (RAM) 24. During normal operation, when a pixel at a given address is to be activated, the RAM 24 supplies x and y correction factors required for proper pixel positioning for optimal linearity and convergence. The correction factors are used by the deflection and correction circuits 5, 7 to make the required adjustment. That is, the correction circuits perform integration and interpolation functions to generate correction signal values which activate the deflection circuits of the display to establish a properly converged and linear image. A correction circuit may be implemented within the teachings by one of ordinary skill in the art. For example, the correction circuit 7 may include an auxiliary yoke which would be separately driven by the signals from the RAM.

As an alternative embodiment, the invention may be implemented with a single photodetector. As per the illustrative embodiment disclosed above, in raster scan image technology, the image is presented in an orderly fashion, pixel by pixel as the electron beam traverses the face of the display 2. Synchronizing pulses dictate the commencement of a picture field and the start of each scanning line. In accordance with the U.S. NTSC commercial television standard, a clock frequency of 3.579545 megahertz (Mhz) is used to establish both a reference for color information demodulation and image scanning. The horizontal synchronizing pulse frequency which establishes the start of each scanning line is 2×3579545/455 or 15730 Hz. Thus, a new line begins every 63.5 microseconds. Since 262.5 lines comprise one field of the picture to be displayed, the onset of a new display field is signaled by the vertical synchronizing pulse which occurs every 16.67 milliseconds, a frequency of 59.94 Hz. As one will readily recognize, the time measured from the onset of a horizontal synchronizing pulse gives the distance from the left hand edge of the picture to a given pixel. This plus the number of horizontal synchronizing pulses since the onset of the vertical synchronizing pulses gives the distance from the top of the picture to a given pixel. Knowing the time from the system clock, the proper position of each pixel may be calculated. The test pattern is therefore a flat field, a picture with all pixels being activated in sequence. The first 21 lines following the horizontal synch pulse are not active picture element lines. Each field is composed of 262.5 lines. The active picture elements begin about 11 microseconds after the horizontal synch pulse. If, for example, a light blocking mask is installed so that a photodetector could respond only to that picture element at the exact center of the screen, one would expect illumination of the desired pixel on the 152nd line about 43 microseconds after the horizontal synch pulse. If the line count current at the instant of pixel illumination is less than 152, the picture is too low relative to the desired position. If the line count is greater than 152, the picture is too high. If the time interval from the horizontal synch pulse to the illumination of the pixel is less than 43 microseconds, the picture is too far to the right. If the interval is greater than 43 microseconds, the picture is too far to the right. If the interval is greater than 43 microseconds, the picture is too far to the left.

Using the signal made by the photodetector to cause the storage of the then current line count and horizontal time provides dynamic information about the image position. Comparing this data with previously stored static data giving the desired line and time coordinates provides the data needed to compute the necessary correction. Since the time interval between events in this sequence is long relative to the response speed of digital circuits, a single photodetector peering at the display through a mask having a plurality of properly positioned holes will detect the passage of the writing beam at each selected location.

Figure 4:
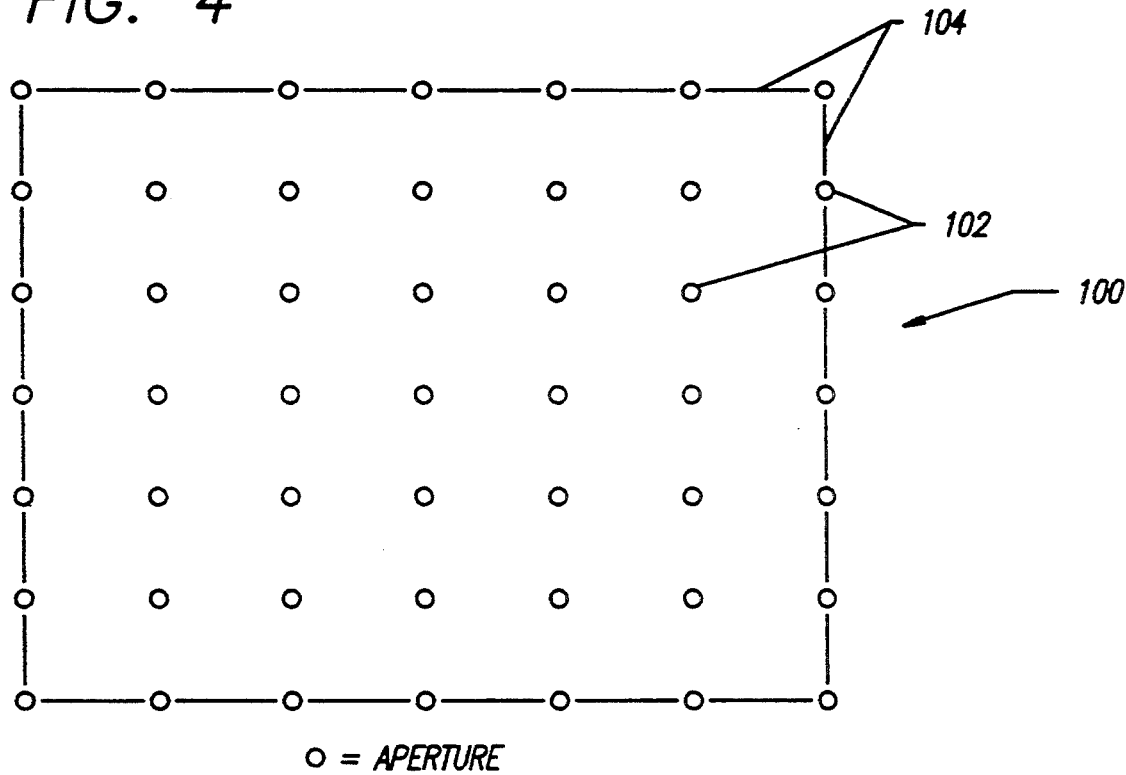
FIG. 4 shows an illustrative mask utilized in the X-Y distortion correction system of the present invention.

FIG. 4 shows an illustrative mask suitable for this purpose. The mask 100 is constructed of light blocking material. The mask has an array of apertures 102 within an image boundary 104.

The difference in time between the detection of illumination through a given hole in the mask 100 and the programmed time for the video information that should cause illumination of that pixel location is the measure of pixel dislocation. The spacing of the mask holes should be far enough apart so that normal and ordinary image distortion will not be large enough to cause confusion between detected and desired pixel locations.

Thus, the present invention has been described herein with reference to a particular embodiment for a particular application. Those having ordinary skill in the art and access to the present teachings will recognize additional modifications applications and embodiments within the scope thereof. For example, the invention is not limited to the generation of a linear image. The present teachings may be used to create warped images without departing from the scope of the invention. Further, the invention is not limited to the implementation shown. The display correction may be implemented with an arithmetic unit as will be appreciated by those skilled in the art.

It is therefore intended by the appended claims to cover any and all such applications, modifications and embodiments within the scope of the present invention.

Accordingly,

What is claimed is:

1. A display system having correction of X-Y image positioning errors, comprising:
   a display comprising means for illuminating picture elements (pixels) on a display screen to form images during a normal display operating mode;
   X-Y image correction means for detecting X-Y image positioning errors during a calibration mode and for correcting operation of said display so that during said operating mode, said pixels are actually illuminated at proper predetermined positions, said correction means comprising:
      means operable during the calibration mode for generating a test pattern of pixels at predetermined nominal display positions;
      means operable during the calibration mode for measuring X-Y positioning errors of the actual displayed location of each errant pixel in said test pattern;
      means operable during the calibration mode for determining, in response to said measured positioning errors, position error correction factors indicative of the magnitude and direction of correction required to restore each errant pixel in said test pattern to its predetermined nominal display position; and
      means operable during the normal display operating mode to apply said position error correction factors to correct for said measured X-Y positioning errors so that actual displayed pixel positions on said screen are at proper predetermined locations.

2. The display system of claim 1 wherein said display is a raster scanned display device.

3. The display system of claim 2 wherein said raster scanned display device comprises a cathode ray tube display device.

4. The display system of claim 1 wherein said means operable during a calibration mode for generating a test pattern includes a test pattern generator including a memory having stored therein data representing said test pattern.

5. The display system of claim 1 wherein said means operable during a calibration mode for generating a test pattern further includes means for selectively connecting said test pattern generator to said display during said calibration mode and means for selectively connecting a nominal display system image source to said display during said normal display operating mode.

6. The display system of claim 1 wherein said means operable during said calibration mode for measuring X-Y positioning errors comprises photodetector means for detecting illumination of display pixels during generation of said test pattern.

7. The display system of claim 6 wherein said photodetector means comprises an array of photodetectors, and said measuring means further includes a fiber optic faceplate disposed between said display screen and said array of photodetectors, said faceplate comprising an array of tightly packed optical fibers to assure that a photodetector comprising said photodetector array is illuminated by no more than a small group of pixels from said display screen.

8. The display system of claim 7 wherein said test pattern comprises sequential illumination of pixels comprising said display, and said means operable during the calibration mode for determining position error correction factors comprises a processor for relating predetermined nominal display positions of each pixel comprising said test pattern to an actual pixel display location as indicated by signals generated by said photodetector array to determine said position error correction factors.

9. The display system of claim 1 wherein said means operable during the normal display operating mode to apply said position error correction factors comprises a memory for storing data representing said correction factors at addresses corresponding to nominal display pixel locations, wherein activation of a nominal display pixel causes retrieval of corresponding position error correction factor data.

10. The display system of claim 1 wherein said display includes a cathode ray tube display device comprising deflection coils driven by display driver means, and said means operable during the normal operating mode to apply said position error correction factors comprises means for applying said correction factors to said display driver means.

11. A method for correcting X-Y image positioning errors in a display, comprising the steps of:
   providing a display comprising means for illuminating picture elements (pixels) on a display screen to form images during a normal display operating mode;
   operating the display during a calibration mode to generate a test pattern of pixels at predetermined nominal display positions;
   measuring X-Y positioning errors of the actual displayed location of each errant pixel in said test pattern;
   determining, in response to said measured positioning errors, position error correction factors indicative of the magnitude and direction of correction required to restore each errant pixel in said test pattern to its predetermined nominal display position; and
   during the normal display operating mode, applying said position error correction factors to correct for said measured X-Y positioning errors so that actual displayed pixel positions on said screen are at proper predetermined locations.

12. The method of claim 11 wherein said display is a raster scanned display device.

13. The method of claim 12 wherein said raster scanned display device comprises a cathode ray tube display device.

14. The method of claim 11 wherein said step of measuring X-Y positioning errors comprises detecting illumination of display pixels during generation of said test pattern.

15. The method of claim 11 wherein said step of generating a test pattern comprises sequentially illuminating pixels comprising said display, and said step of determining position error correction factors comprises relating predetermined nominal display positions of each pixel comprising said test pattern to an actual pixel display location as indicated by said illumination of pixels during generation of the test pattern to determine said position error correction factors.

16. A display system having correction of X-Y image positioning errors, comprising:
- a display comprising means for illuminating pixels on a display screen to form images during a normal display operating mode, said display comprising a raster scanned display including raster scanned pixel lines marked by vertical and horizontal synchronization display timing signals;
- X-Y image correction means for detecting X-Y image positioning errors during a calibration mode and for correcting operation of said display so that during said operating mode, said pixels are actually illuminated at proper predetermined positions, said correction means comprising:
  - means operable during the calibration mode for generating a test pattern of pixels at predetermined nominal display positions;
  - means operable during the calibration mode for measuring X-Y positioning errors of the actual displayed location of each errant pixel in said test pattern, said measuring means comprising a single photodetector element for generating a photodetector signal in response to activation of pixel elements, and a mask interposed between said display screen and said photodetector, said mask having a plurality of spaced holes formed therein;
  - means operable during the calibration mode for determining, in response to said measured positioning errors, position error correction factors indicative of the magnitude and direction of correction required to restore each errant pixel in said test pattern to its predetermined nominal display position, said determining means comprising processor means responsive to said photodetector signal and to said synchronization timing signals for calculating said correction factors; and
  - means operable during the normal display operating mode to apply said position error correction factors to correct for said measured X-Y positioning errors so that actual displayed pixel positions on said screen are at proper predetermined locations.

* * * * *